United States Patent
Wilson

(10) Patent No.: US 8,024,409 B2
(45) Date of Patent: Sep. 20, 2011

(54) METHOD AND SYSTEM FOR AUTOMATICALLY RESENDING MESSAGES BASED ON SERVER STATUS

(75) Inventor: Jeffrey Kenneth Wilson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 548 days.

(21) Appl. No.: 11/530,682

(22) Filed: Sep. 11, 2006

(65) Prior Publication Data

US 2008/0065730 A1    Mar. 13, 2008

(51) Int. Cl.
G06F 15/16 (2006.01)
G06F 15/173 (2006.01)
(52) U.S. Cl. ........ 709/206; 709/224
(58) Field of Classification Search ........ 709/201–207
See application file for complete search history.

(56) References Cited

U.S. PATENT DOCUMENTS

| | | | |
|---|---|---|---|
| 6,708,205 B2 * | 3/2004 | Sheldon et al. | 709/206 |
| 6,973,486 B2 | 12/2005 | Blakeney | |
| 2003/0110224 A1 | 6/2003 | Cazier et al. | |
| 2003/0134621 A1 | 7/2003 | Yabe et al. | |
| 2004/0215724 A1 | 10/2004 | Smoot et al. | |
| 2005/0120085 A1 * | 6/2005 | Ito et al. | 709/206 |
| 2005/0198155 A1 | 9/2005 | Zakharoff | |
| 2006/0112166 A1 * | 5/2006 | Pettigrew et al. | 709/206 |
| 2009/0019126 A1 * | 1/2009 | Adkins | 709/206 |

OTHER PUBLICATIONS

U.S. Appl. No. 11/530,648, filed Sep. 11, 2006, Wilson.
U.S. Appl. No. 11/530,632, filed Sep. 11, 2006, Wilson.

* cited by examiner

*Primary Examiner* — Ian N Moore
*Assistant Examiner* — Afshawn Towfighi
(74) *Attorney, Agent, or Firm* — Yee & Associates, P.C.; Justin M. Dillon

(57) ABSTRACT

A computer-implemented method, apparatus, and computer program product for resending a message based on server status. The message is sent to a recipient. The message is stored to be resent in response to receiving a notification that the message could not be delivered to the recipient. Status of an email server associated with the recipient of the message is requested. The message is resent in response to the status indicating that messages may be received by the recipient.

16 Claims, 3 Drawing Sheets

METHOD AND SYSTEM FOR AUTOMATICALLY RESENDING MESSAGES BASED ON SERVER STATUS

BACKGROUND

1. Technical Field

The present invention relates generally to an improved data processing system. More particularly, the present invention relates to a computer-implemented method, apparatus, and computer program product for automatically resending messages based on server status.

2. Description of the Related Art

Modern computing technology has resulted in immensely complicated and ever-changing environments. The Internet is a global network of computers and networks joined together by means of gateways that handle data transfer and the conversion of messages from a protocol of the sending network to a protocol used by the receiving network. On the Internet, any computer may communicate with any other computer with information traveling over the Internet through a variety of languages, also referred to as protocols. The set of protocols used on the Internet is called transmission control protocol/Internet protocol (TCP/IP).

The Internet has revolutionized communications and commerce, as well as being a source of both information and entertainment. For many users, email is a widely used format to communicate over the Internet. The existence and continued acceptance and use of the Web and the Internet have resulted in many new and useful applications becoming available to users of the Internet. One useful and popular application that most everyone with access to the Internet uses is electronic mail (email). Email is an electronic message sent over connections between data processing systems on a network. Email allows for a method of personal communication without requiring face-to-face contact. An email account allows a user to communicate a message to an intended email recipient. This type of communication is available even if the recipient has a different service provider than the sender. Email is typically based on a standard communication protocol that allows the communication of messages between individuals that may have different service providers. Email allows communication across the different communication protocols using only the recipient's email address.

Many email servers maintain user space quotas. These quotas limit the amount of storage that a user is allowed to take up for storing email. For most businesses with large storage capacities and for individual users who typically receive very small email, this is not usually much of an issue. However, for the growing number of small businesses who are becoming more and more expected to handle email as part of their everyday business, ensuring a constant "online" status while managing expenses can be a challenge. For example, most customers now expect everyone from their lawn service provider to bakery to have a website and/or email contact information.

Additionally, many email senders are frustrated when a message is "bounced back" or otherwise returned. For many people communicating via email, the process of having a message rejected is very frustrating. If the receiving party is unaware of the problem or not well trained regarding the different technologies, it might take some time before the quota or other problem is rectified. As a result, the sending party may have to either try continuously to manually resend the email or use some other method of communication to notify the receiver. In either way, the process of ensuring that the receiving party receives the necessary communication may be both frustrating and time consuming.

BRIEF SUMMARY

The illustrative embodiments described herein provide a computer-implemented method, apparatus, and computer program product for resending a message based on server status. The message is sent to a recipient. The message is stored to be resent in response to receiving a notification that the message could not be delivered to the recipient. Status of an email server associated with the recipient of the message is requested. The message is resent in response to the status indicating that messages may be received by the recipient.

BRIEF DESCRIPTION OF THE DRAWINGS

The novel features believed characteristic of the illustrative embodiments are set forth in the appended claims. The illustrative embodiments, themselves, however, as well as a preferred mode of use, further objectives, and advantages thereof, will best be understood by reference to the following detailed description of an illustrative embodiment when read in conjunction with the accompanying drawings, wherein:

DETAILED DESCRIPTION OF AN ILLUSTRATIVE EMBODIMENT

Figure 1:
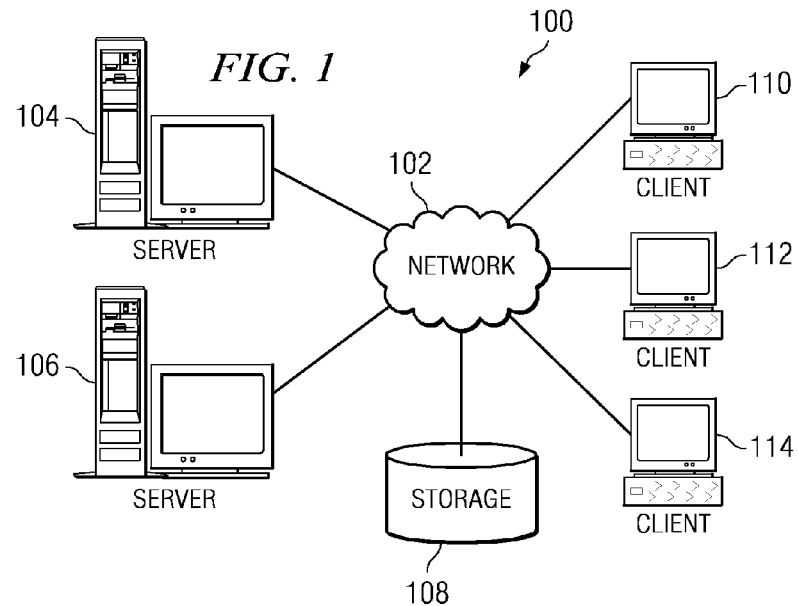
FIG. 1 is a pictorial representation of a data processing system in which illustrative embodiments of the present invention may be implemented.
Figure 2:
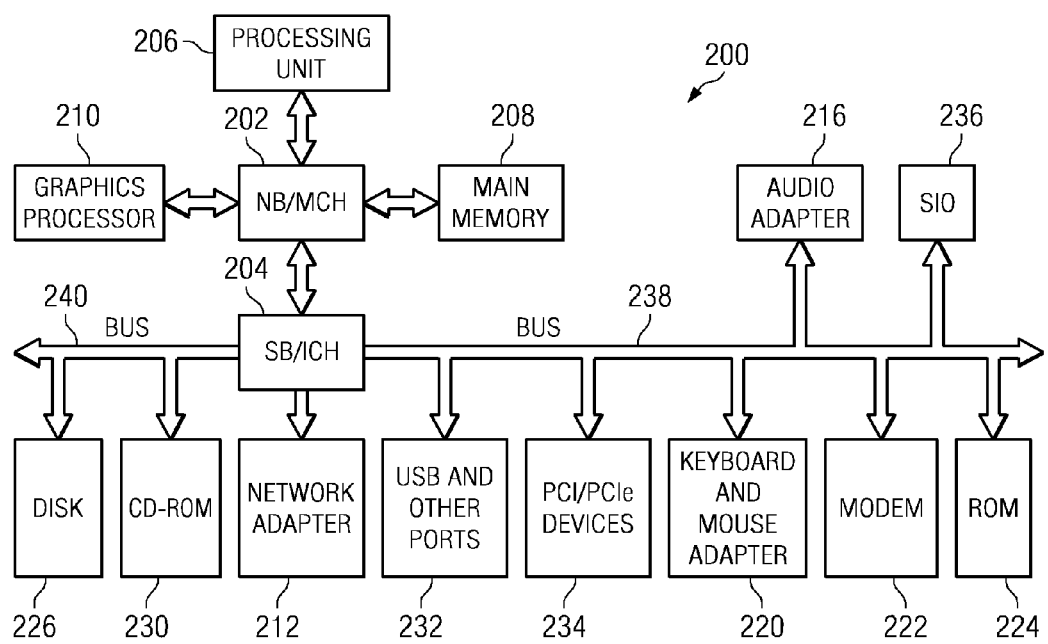
FIG. 2 is a block diagram of a data processing system in which illustrative embodiments of the present invention may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which one or more embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 of FIG. 1, in which computer usable code or instructions implementing processes or methods as described herein may be located for illustrative embodiments of the present invention.

In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

In the illustrative embodiment of FIG. 2, an operating system runs on processor 206 and coordinates and provides control of various components within data processing system 200. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provide calls to the operating system from Java programs or applications executing on data processing system 200 (Java and all Java-based trademarks are trademarks of Sun Microsystems, Inc. in the United States, other countries, or both).

Instructions for the operating system, the object-oriented programming system, and applications or programs are located on storage devices, such as hard disk drive 226, and may be loaded into main memory 208 for execution by processor 206. The processes of the illustrative embodiments may be performed by processor 206 using computer implemented instructions, which may be located in a memory such as main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
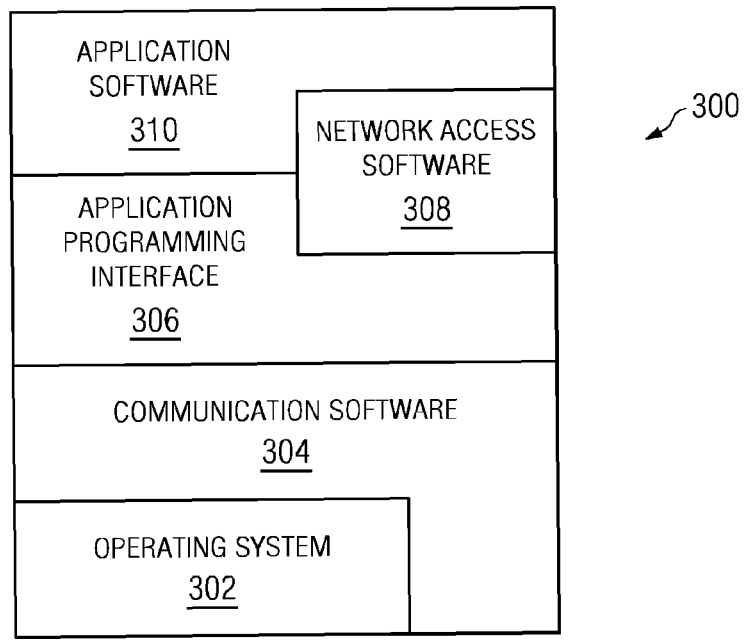
FIG. 3 is a block diagram depicting typical software architecture for a server-client system in which illustrative embodiments of the present invention may be implemented.

Turning to FIG. 3, typical software architecture for a server-client system is depicted in which illustrative embodiments of the present invention may be implemented. At the lowest level, operating system 302 is utilized to provide high-level functionality to the user and to other software. Such an operating system typically includes a basic input output system (BIOS). Communication software 304 provides communications through an external port to a network such as the Internet via a physical communications link by either directly invoking operating system functionality or indirectly bypassing the operating system to access the hardware for communications over the network.

Application programming interface (API) 306 allows the user of the system, an individual, or a software routine, to invoke system capabilities using a standard consistent interface without concern for how the particular functionality is implemented. Network access software 308 represents any software available for allowing the system to access a network. This access may be to a network, such as a local area network (LAN), wide area network (WAN), or the Internet. With the Internet, this software may include programs, such as Web browsers.

Application software 310 represents any number of software applications designed to react to data through the communications port to provide the desired functionality the user seeks, such as email messaging clients. Applications at this level may include those necessary to handle data, video, graphics, photos, or text which can be accessed by users of the Internet. The illustrative embodiments may be implemented in any of the software elements of FIG. 3. In particular, the illustrative embodiments may be implemented in application software 310, such as email application software, implemented on an email server such as server 104 of FIG. 1. The email application used by a user to access email on a server may be implemented using network access software 308 on a client such as client 110 of FIG. 1.

The illustrative embodiments provide a computer implemented method, apparatus, and computer program product for automatically resending messages based on server status. The illustrative embodiments allow emails that are rejected back to the sender to be saved for resending at a later time.

Email messages are most frequently rejected for surpassing a specified quota. The quota is a rule, term, parameter, or other limitation for the email server. The most frequent reason for email rejection results from the user exceeding a storage quota. Most email servers have quotas set in megabytes. Such storage quotas may be quickly surpassed when email messages include pictures, videos, or other memory intensive attachments, files, or objects. In another example, the user may have a quota specifying the maximum number of messages that may be received in a day. The quota may also specify that certain types of files, such as executable files, are unacceptable and therefore automatically rejected. Messages may also be rejected based on questionable or inappropriate content that may include viruses or other malicious programs. There may be any number of reasons why a message is rejected in addition to those examples provided herein. The illustrative embodiments allow the sender to store an original email message to be resent in response to receiving a failure notification. The email application pings the email server at a designated interval to determine the status of the email server. Once the email server has a status indicating that the email server is ready to receive messages, the original email message is automatically resent. As a result, the sender does not have to worry about manually resending a message only to find that the email server problem has never been rectified. Any messages that were rejected are automatically resent based on the users' preferences, saving time and effort.

Figure 4:
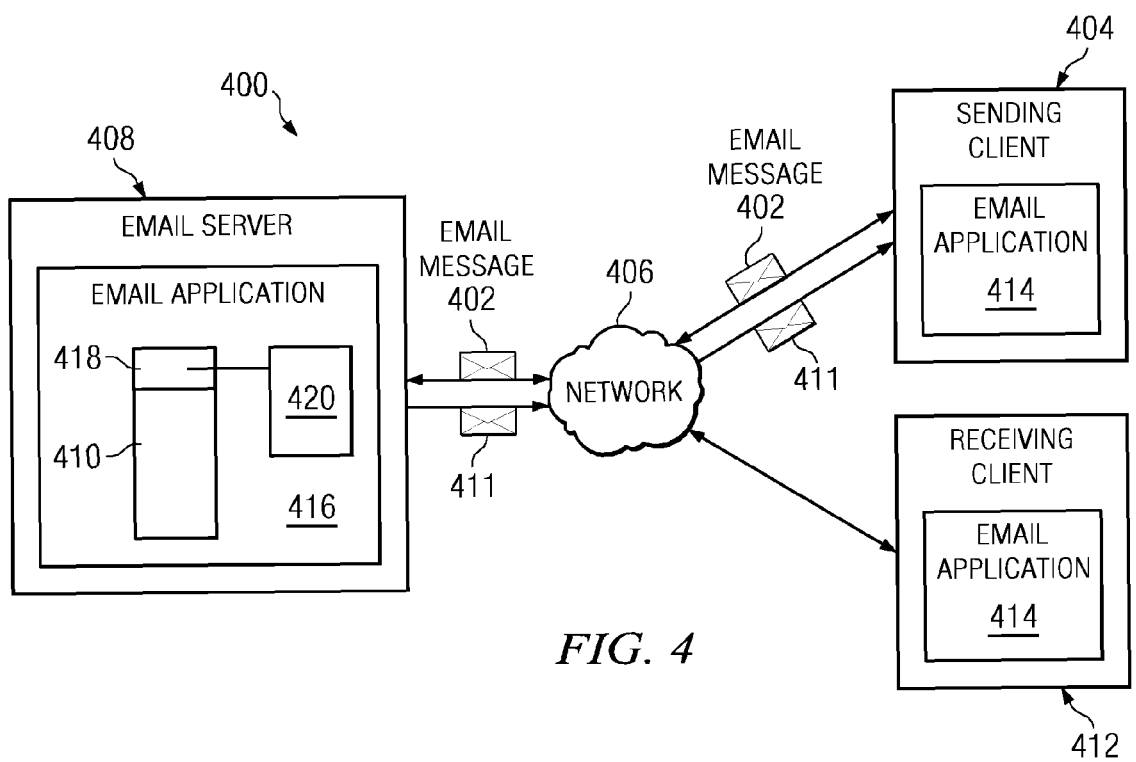
FIG. 4 is a block diagram of an email exchange system in accordance with an illustrative embodiment of the present invention.

FIG. 4 is a block diagram of an email exchange system in accordance with an illustrative embodiment of the present invention. Email exchange system 400 is an exemplary system for sending and receiving email messages. In one example, email message 402 is generated and sent from sending client 404 through network 406 to email server 408. Sending client 404 is used only for illustration purposes. Any number of sending clients may send messages in email exchange system 400. In this example, email message 402 is rejected from being received by email server 408 because the user has exceeded quota 410. As described, quota 410 is a storage quota but may take other forms. Subsequently, failure notification 411 may be returned to sending client 404. Failure notification 411 indicates that email message 402 was rejected by email server 408. As a result, the user or receiving party is unable to receive email message 402 at receiving client 412.

Sending client 404 and receiving client 412 may be clients, such as clients 110, 112, and 114 of FIG. 1. Email server 408 may be a server, such as servers 104 and 106 of FIG. 1. Sending client 404, receiving client 412, and email server 408 may communicate through network 406 using a land or hard line, such as fiber optics, telephone, cable, power lines, or may be received wirelessly.

Sending client 404 and receiving client 412 may use email application 414 to send and receive messages. Email application 414 may be a program application, such as Microsoft Outlook®, Eudora®, and other commonly used email applications. Alternatively, email application 414 may be an Internet browser or similar application for accessing email application 416 of email server 408. For example, a user accessing receiving client 412 may use Internet Explorer® to access email application 416, such as Yahoo® Mail on email server 408. Email applications 414 and 416 may be software applications, such as application software 310 of FIG. 3. Alternatively, email application 414 may be network access software, such as network access software 308 of FIG. 3.

The email identifier and error code are included in failure notification 411 for allowing email application 414 to identify email message 402 and why it was rejected. The email identifier may be a sequence of numbers or characters used to identify email message 402, such as 08240600015a. The email identifier may include information regarding the date and time email message 402 was originally received. The error code identifies the problem or reason email message 402 was rejected. For example, error code 201 may be used to indicate quota 410 has been exceeded. Reserve 418 is used to store rejected message file 420. Rejected message file 420 is information or metadata extracted from a rejected message, such as name, email address, subject line, and date and time. Rejected message file 420 includes entries for each rejected message in concise terms so that each entry consumes very little space in reserve 418. In one example, if the quota is 10 Mb and 100 kb is specified for reserve 418, once the quota reaches 9.9 Mb, failure notification 411 is sent back to sending client 404.

When failure notification 411 is sent as an email response to email message 402, indicating that quota 410 is surpassed, failure notification 411 is likely sent from a specific mailer daemon address with email identifier and error code identifying the problem. Email application 414 associates email message 402 with failure notification 411 when failure notification 411 is received using information, such as sending time, recipient, email address, or other identifiers. Email application 414 automatically places email message 402 and any attached files in a folder, such as drafts or "auto-resend", in response to receiving failure notification 411. At any time, the user may click a button or give an indication, manually commanding email application 414 to resend, delete, or abandon resending email message 402.

Alternatively, the user may specify auto-resend preferences for specifying the circumstances and conditions for automatically resending email message 402. Email application 414 may be configured to associate failure notification 411 with email message 402. Email message 402 may be associated using an email identifier, error code, mailer daemon address, or other any other information. The illustrative embodiments of the present invention describe the process of automatically retrying an intended email address. Email application 414 is configured to ping email server 408 to "listen for" error codes or determine status. For example, failure notification 411 may include error code 552 indicating that the recipient's email quota was overloaded.

Email server 408 is pinged to determine status at a predetermined interval. The predetermined interval is how frequently email server 408 is instructed to be pinged by email application 414 of sending client 404. For example, the auto-resend preferences may set the predetermined interval at every 30 minutes, hour, six hours, day, or other specified interval. Email message 402 is only resent once the status of email server 408 indicates that the error or other problem has been corrected. As a result, time, bandwidth, and processing cycles are not spent trying to send a message that will not be received anyway. Email application 414 continuously pings email server 408 until the status is okay or acceptable to receive email message 402, at which point email message 402 is resent for access by receiving client 412 and the receiving party. At any point, the sender may select to give up on resending email message 402 or delete email message 402 from email application 414.

The user may have configured auto-resend preferences within email application 414. For example, the auto-resend preferences may specify addresses, content, or other criteria for automatically resending messages based on the status of the respective email servers associated with the email account of each receiving party. For example, the user may have selected to only retry messages going to email addresses ending in irs.gov and yahoo.com.

Figure 5:
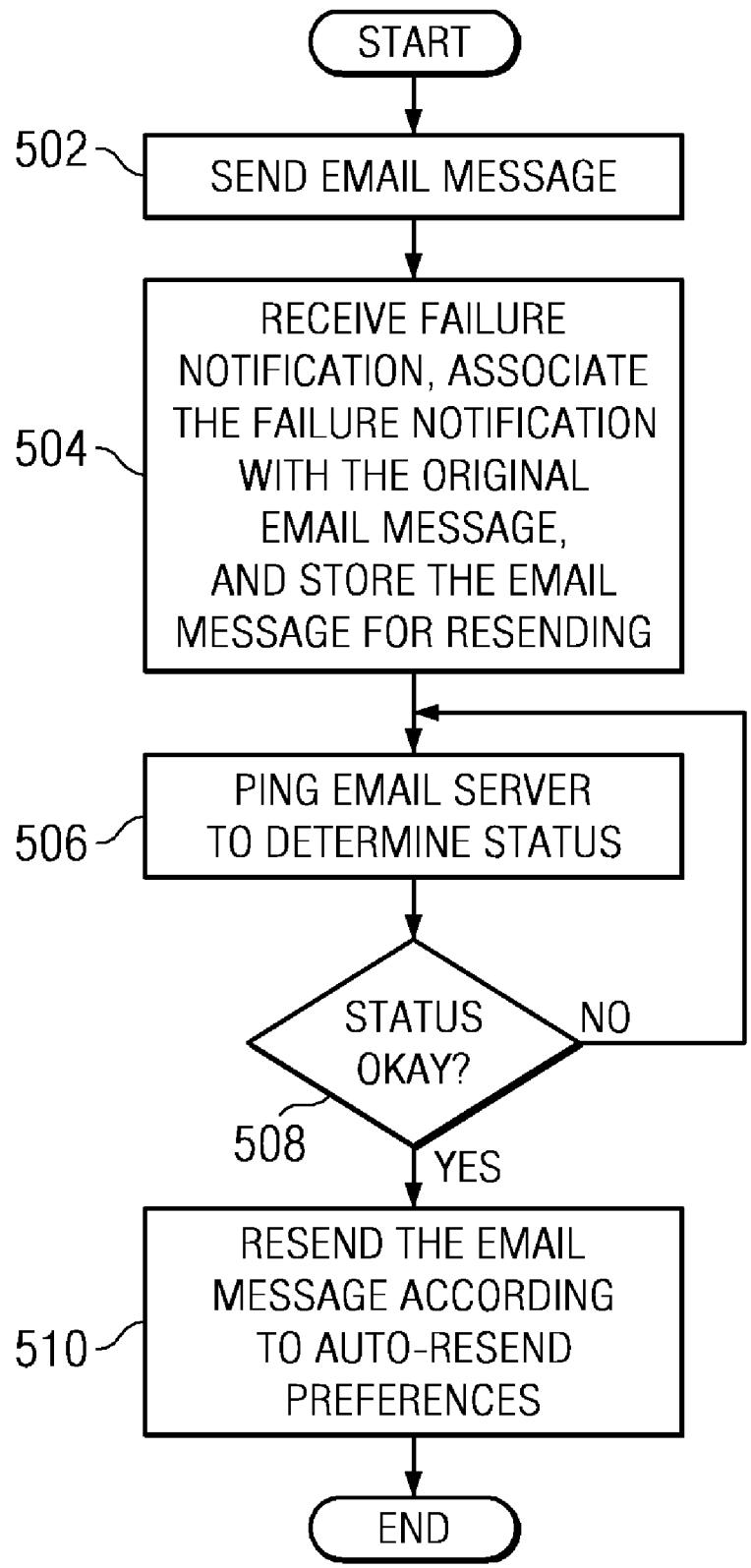
FIG. 5 is a flowchart illustrating a process for resending a message based on server status in accordance with an illustrative embodiment of the present invention.

FIG. 5 is a flowchart illustrating a process for resending a message based on server status in accordance with an illustrative embodiment of the present invention. The process in FIG. 5 may be implemented by an email application of a sending device, such as email application 414 on sending client 404 of FIG. 4.

The process begins by sending an email message (process block 502). The email message may be email message 402 of FIG. 4. Next, the email application receives a failure notification, associates the failure notification with the original email message, and stores the email message for resending (process block 504). The failure notification may be failure notification 411 received from email application 416 of email server 408, all of FIG. 4. The original message may be saved in a drafts folder, auto-resend folder, or other file or directory designated by the email application. Next, the email application pings the email server to determine status (process block 506). The correction notification may be failure notification 411 received from email server 408, both of FIG. 4.

Next, the email application determines whether the status is okay (process block 508). The status is ready or okay if the message problem has been taken care of. For example, the status may not be okay because the original message may be a 1 MB email where there is less than 1 MB of available space in the user's quota, such as quota 410 of FIG. 4. The original message cannot be resent until the status of the email server indicates that the email server is ready to receive messages. In process block 508, the email server determines whether any subsequent messages will be rejected based on software stipulations or other application rules in addition to quota specific rejections. The status may be specified by a response from the email server. For example, a response of 201 may indicate that there is still a message problem, but a response of 101 may indicate that the email server is ready to receive messages.

If the status is not okay, the email application pings the email server to determine status (process block 506). If the email application determines the status is okay in process block 508, the email application resends the email message according to auto-resend preferences (process block 510) with the process terminating thereafter.

Thus, the illustrative embodiments provide a computer implemented method, apparatus, and computer program product for responding to reject email message. Messages sent to a user and subsequently rejected are logged, cataloged, or otherwise recorded. A failure notification is sent to the sender indicating that the message failed and specifying an email identifier and error code. The email application of the sender associates the original email message with the failure notification and saves the original email message to automatically be resent. The email application pings the email server at predetermined intervals to determine the status of the email server. Once the email account on the email server is online or otherwise ready to receive additional messages, the original email message is automatically resent. By only sending a ping, network traffic is reduced and the larger email messages do not have to be sent. As a result, the sender is able to efficiently send a message to receiving parties once the message may be successfully received for more effective electronic communication.

Embodiments of the present invention may be implemented entirely in hardware, entirely in software or using a combination of both hardware and software elements. In one embodiment, the invention is implemented in software, including but not being limited to firmware, resident software, microcode, or the like.

Furthermore, the invention can take the form of a computer program product accessible from a computer-usable medium or computer-readable medium providing program code for use by or in connection with a computer or any instruction execution system. For the purposes of this description, a computer-usable medium or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium storage include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a communication medium (e.g., a system bus). The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention embodiments in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

What is claimed is:

1. A computer implemented method for resending a message based on server status, the computer implemented method comprising:
  sending, by a processing unit, the message to a recipient;
  responsive to receiving a notification that the message could not be delivered to the recipient:
    storing the message to be resent;

extracting metadata from the message for storing information about the message;
associating the notification with the message using the metadata, wherein the metadata includes an email identifier; and
sending, by an email application associated with a sending client, the notification and the metadata for associating the notification with the message to the sending client;
requesting a status of an email server associated with the recipient of the message;
responsive to identifying that the message could not be delivered because a storage quota associated with the recipient has been exceeded:
identifying, by the email application associated with the sending client, a size of the message and an amount of storage remaining in the storage quota associated with the recipient, wherein the status of the email server associated with the recipient includes the amount of storage remaining in the storage quota; and
determining, by the email application associated with the sending client, whether the size of the message exceeds the amount of storage remaining in the storage quota associated with the recipient;
responsive to determining that the size of the message does not exceed the amount of storage remaining in the storage quota associated with the recipient, determining, by the email application associated with the sending client, that the status of the email server associated with the recipient indicates that the message can be received by the recipient; and
responsive to determining that the status indicates that the message can be received by the recipient, automatically resending the message to the recipient.

2. The computer implemented method of claim 1, wherein requesting the status of an email server associated with the recipient of the message comprises:
pinging the email server to determine that an error code associated with the notification is no longer present; and
delaying resending the message until receiving the status indicating that messages may be received by the recipient.

3. The computer implemented method of claim 1, wherein the notification is a failure notification and was sent because the storage quota was exceeded.

4. The computer implemented method of claim 3, wherein the storage quota is a user storage quota associated with an email account of the recipient.

5. The computer implemented method of claim 1, wherein the message is an email message.

6. The computer implemented method of claim 1, wherein automatically resending the message to the recipient comprises:
automatically resending the message according to auto-resend preferences.

7. The computer implemented method of claim 1, wherein the metadata specifies an error code indicating why the message could not be delivered.

8. The computer implemented method of claim 7, wherein the metadata includes an email address, a subject, and a date and time.

9. The computer implemented method of claim 1, further comprising:
responsive to receiving a user indication, attempting to resend the message based on the user indication; and
responsive to receiving an abort notification from the user, aborting attempts to resend the message.

10. A system comprising:
a bus;
a storage device operably connected to the bus, wherein the storage device stores program code for resending a message based on server status; and
a processing unit operably connected to the bus, wherein the processing unit is configured to execute the program code to:
send a message to a receiving client associated with a recipient;
in response to receiving a notification that the message could not be delivered to the recipient:
store the message to be resent;
extract metadata from the message for storing information about the message;
associate the notification with the message using the metadata, wherein the metadata includes an email identifier; and
send the notification and the metadata for associating the notification with the message to a sending client;
request a status of an email server associated with the recipient of the message;
in response to identifying that the message could not be delivered because a storage quota associated with the recipient has been exceeded:
identify a size of the message and an amount of storage remaining in the storage quota associated with the recipient, wherein the status of the email server associated with the recipient includes the amount of storage remaining in the storage quota; and
determine whether the size of the message exceeds the amount of storage remaining in the storage quota associated with the recipient;
determine that the status of the email server associated with the recipient indicates that the message can be received by the recipient in response to determining that the size of the message does not exceed the amount of storage remaining in the storage quota associated with the recipient; and
automatically resend the message to the receiving client in response to determining that the status indicates indicating that the message can be received by the recipient.

11. The system of claim 10, wherein the sending client connects to the email server using a client email application and wherein the sending client aborts attempts to resend the message in response to receiving an abort notification from a user.

12. The system of claim 10, wherein the sending client associates the notification with the message using the metadata to save the message to be resent later.

13. The system of claim 10, wherein the sending client requests the status of the email server by pinging the email server to retrieve error codes and delays resending the message until receiving the status indicating that messages may be received by the recipient.

14. A computer program product comprising:
a computer readable storage device storing program code for resending a message based on server status;
program code, stored on the computer readable storage device, for sending the message to a recipient;
program code, stored on the computer readable storage device, responsive to receiving a notification that the message could not be delivered to the recipient for:
storing the message to be resent;

extracting metadata from the message for storing information about the message;
associating the notification with the message using the metadata, wherein the metadata includes an email identifier; and
sending the notification and the metadata for associating the notification with the message to a sending client;

program code, stored on the computer readable storage device, for requesting a status of an email server associated with the recipient of the message;

program code, stored on the computer readable storage device, responsive to identifying that the message could not be delivered because a storage quota associated with the recipient has been exceeded for:
identifying a size of the message and an amount of storage remaining in the storage quota associated with the recipient, wherein the status of the email server associated with the recipient includes the amount of storage remaining in the storage quota; and
determining whether the size of the message exceeds the amount of storage remaining in the storage quota associated with the recipient;

program code, stored on the computer readable storage device, responsive to determining that the size of the message does not exceed the amount of storage remaining in the storage quota associated with the recipient, for determining that the status of the email server associated with the recipient indicates that the message can be received by the recipient; and program code, stored on the computer readable storage device, responsive to determining that the status indicates that the message can be received by the recipient, for automatically resending the message to the recipient.

15. The computer program product of claim 14, wherein the program code for requesting the status of the email server associated with the recipient comprises:
program code, stored on the computer readable storage device, for pinging the email server associated with the recipient to determine the status for automatically resending the message according to auto-resend preferences; and
program code, stored on the computer readable storage device, for delaying resending the message until receiving a status indicating that messages may be received by the recipient.

16. The computer program product of claim 15, wherein the program code for pinging the email server associated with the recipient further comprises:
program code, stored on the computer readable storage device, for determining that an error code associated with the notification is no longer present;
program code, stored on the computer readable storage device, responsive to receiving an abort notification from a user, for aborting attempts to resend the message; and
program code, stored on the computer readable storage device, responsive to receiving a resend notification from the user, for resending the message.

* * * * *